United States Patent
Ness et al.

(10) Patent No.: US 6,328,583 B2
(45) Date of Patent: Dec. 11, 2001

(54) RE-CONNECTABLE PIPELINE CONNECTION FOR DIRECT HEATING SYSTEM

(75) Inventors: Bjorn Willy Ness, Oslo; Petter Thomas Holen, Klofta; Jan Erik Karlsen, Kolbotn, all of (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/729,242

(22) Filed: Dec. 5, 2000

(30) Foreign Application Priority Data

Dec. 28, 1999 (NO) .................................................. 99/6522

(51) Int. Cl.⁷ .................................. H01R 4/60; H01R 4/38
(52) U.S. Cl. ......................... 439/193; 439/766; 439/805
(58) Field of Search .................................... 439/193, 766, 439/805, 192, 194, 195; 219/212, 213

(56) References Cited

U.S. PATENT DOCUMENTS 1,932,456 * 10/1933 Gaston .................................. 439/551

4,405,196 * 9/1983 Fulton .................................... 361/38

FOREIGN PATENT DOCUMENTS 2 563 606 B1    10/1986  (FR) .

* cited by examiner

*Primary Examiner*—Brian Sircus
*Assistant Examiner*—Chandrika Prasad
(74) *Attorney, Agent, or Firm*—Sughrue Mion, PLLC

(57) ABSTRACT

A cable connector for a direct heating cable system for a pipeline (4) where a direct heating cable is connected to the pipeline at two remote points, the cable (3) comprising a cone (1) connected to the end, the cone (1) comprising means for connecting releasably a bolt (9) coaxially to the cone (1), a pulling wire (7) being secured to the bolt (9) adapted to pull the cone (1) and the cable (3) into a connector (2) secured to the pipeline and having an inner shape corresponding with the outer shape of the cone (1), the connector (2) being adapted to lock the cone (1) to the connector (2) and release the pulling wire (7) from the cone (1).

2 Claims, 2 Drawing Sheets

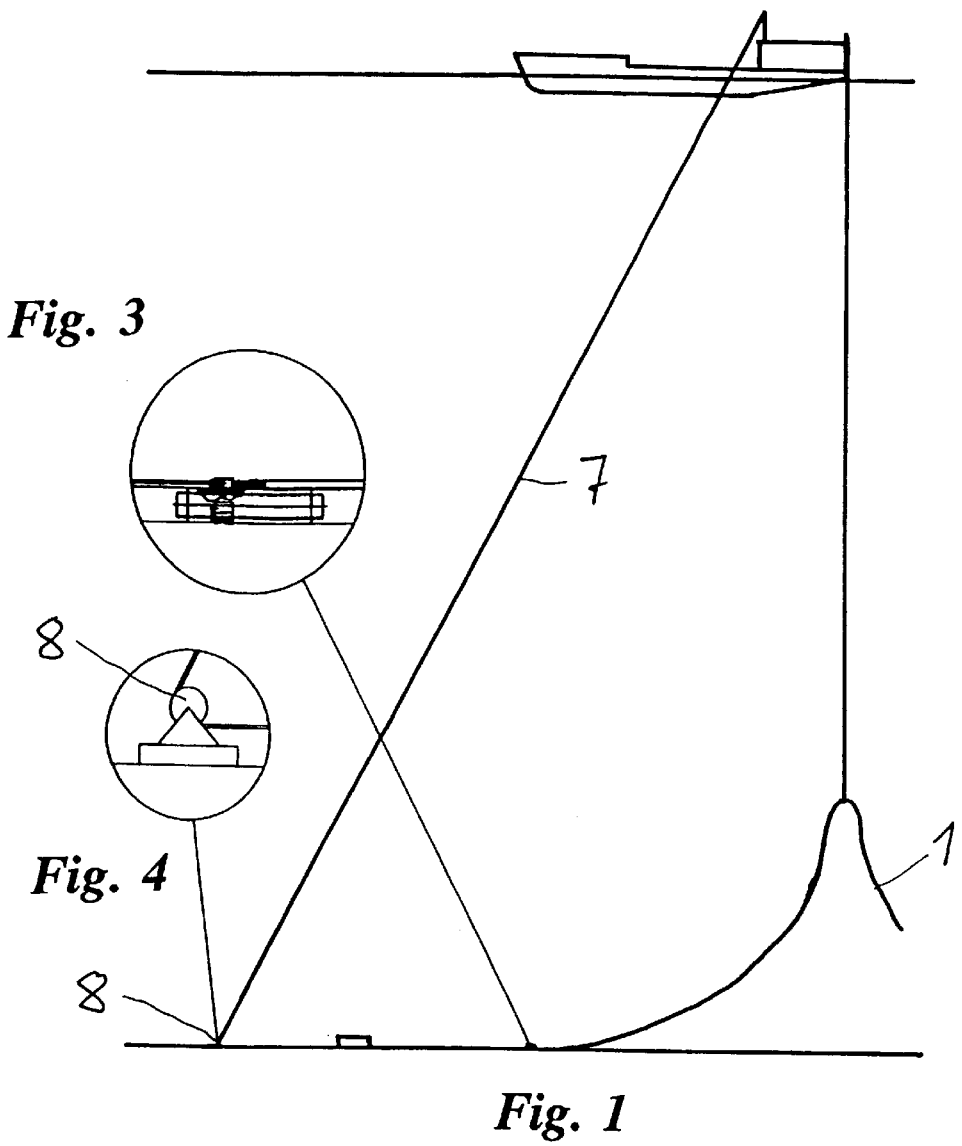
*Fig. 3*
*Fig. 4*
*Fig. 1*
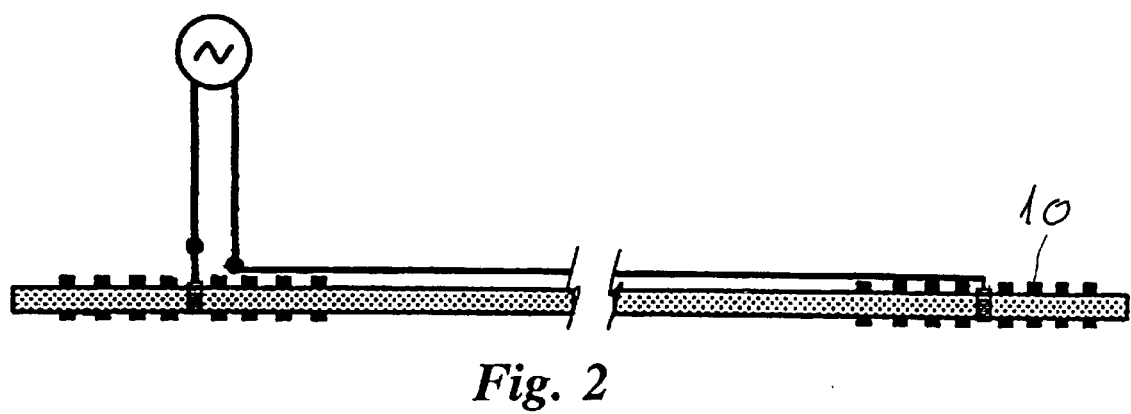
*Fig. 2*

RE-CONNECTABLE PIPELINE CONNECTION FOR DIRECT HEATING SYSTEM

The present invention is related to a cable connector for a direct heating cable system for a pipeline.

It is well known to provide heating cable systems for transfer of electrical power to production pipelines lying on the seabed to prevent hydrate formation of the fluid transported in the pipe. The functioning of such a direct heating system very much is depending on a proper connection between the heating cable and the production pipeline.

Furthermore, the functioning of such a heating system is depending on several parameters such as a low impedance connection at both ends of the heating cable, thereby to prevent corrosion and local heating spots. Furthermore such a connection must have the ability to withstand mechanical forces applied during installation of the pipeline as well as later movement due to thermal cycles, even in cases where the connection is pinched between the pipeline and the seabed. In case the cable is damaged, the connection has to be releasable without the need to move the pipeline as such and providing good possibilities for reinstalling a new heating cable.

The heating cable connection according to the present invention fulfils all the previous mentioned requirements, being defined by the features stated in the claims.

Figure 5:
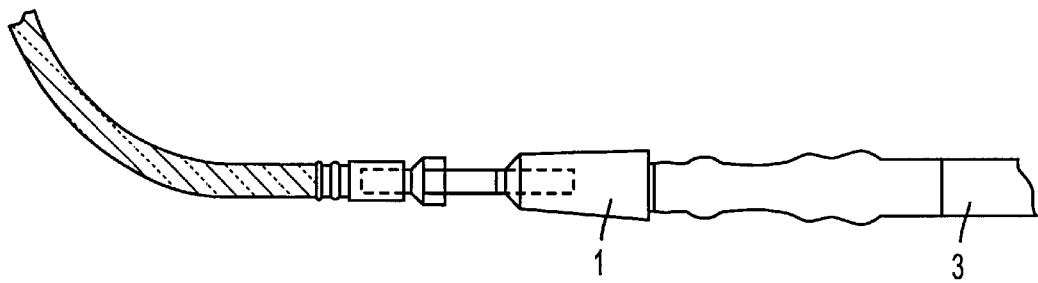
Figure 6:
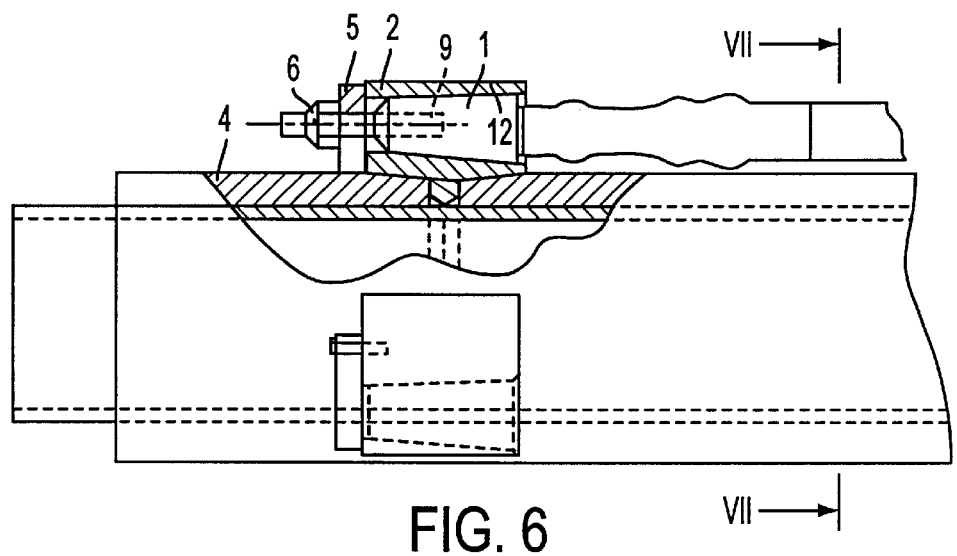
Figure 7:
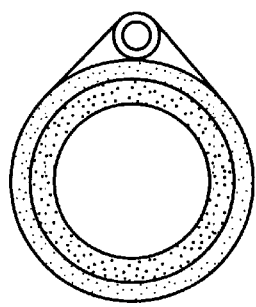
Figure 8:
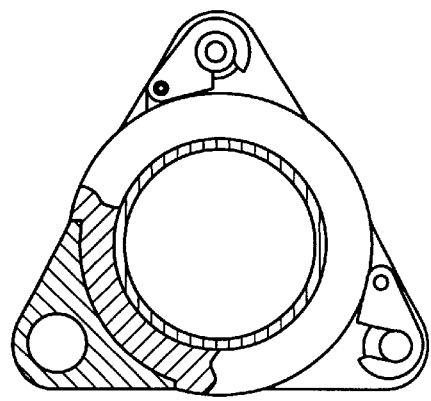

FIG. 1 of the drawing discloses schematically the repair installing procedure for a heating cable, FIG. 2 discloses also schematically, the circuit for a heating cable on a pipeline, FIG. 3 discloses a detail in FIG. 1, namely the connection between the heating cable connector and a pulling wire, FIG. 4 discloses, also schematically an angle wheel for the pulling wire, FIG. 5 discloses the connection between the pulling wire and the heating cable connector, FIG. 6 discloses schematically and partly in a longitudinal section the heating cable connected with the pipeline, FIG. 7 discloses a cross-section of the pipeline with the heating cable as disclosed in FIG. 6, and FIG. 8 discloses a front view from the left in FIG. 6, of the heating cable connection.

A heating cable 3 is provided with a cone 1 at each end, adapted to fit into a conical female chamber 12 of a connector 2 which is prewelded to a pipeline 4. The connection device is provided with a locking plate 5 and a nut 6 for tightening the cone 1 into the connector 2.

The pipeline 4 is equipped with preferably three equal steel connectors displaced 120° offset to each other, thereby being adapted for receiving heating cables in 3 positions. This is to ensure that at least one connection device is available from the upper portion of the pipe.

The truncated shape of the cone 1 as well as the connector 2 ensure good connection between the two as a high pressure may be exposed by the nut 6 and the corresponding bolt.

The locking plate 5 preferably is a hinged plate for easy locking of the termination before tightening the nut 6 against the locking plate 5.

For connection of a heating cable 3 to connection with the connector 2, a laying vessel and a remote-operated vessel (ROV) is used, the laying vessel thereby pulling the connector in place with a pulling wire 7 running through the steel cone and a tuning wheel 8 up to the lying vessel. The ROV is monitoring the installation operation and later will cut away the pulling wire 7 after having tightened the nut 6 against the locking plate 5 and the connector 2, thereby forcing the cone 1 against the connector 2 by means of the bolt 9 connected to the inner of the cone 1.

The cross section electrical current in the connection has to be carefully controlled throughout the current path in the connection. The conductivity in the crossover between copper and steel equals the conductivity of the cable conductor as such, resulting in no local heating. The cross-section of the welds connecting the steel connectors 2 to the pipeline 4 equals the cross-section of the pipeline as such. The temperature in the welds thereby will be similar to the temperature in the pipeline.

The connection according to the present invention provides mechanical properties at least equal to the mechanical properties of the cable. All steel parts and welds will be made of materials compatible with the material used in the steel pipeline. As disclosed in FIG. 2, anodes 10 of aluminium or zinc will be applied to protect the connection from corrosion. Furthermore, dummy plugs protect the surface of spare connection points until they are needed.

What is claimed is:

1. A cable connector for a direct heating cable system for a pipeline (4) where a direct heating cable is connected to the pipeline at two remote points by means of connectors (2) being connected with the pipeline (4), each of said connectors including a conical female chamber for receiving a cone (1) connected to the ends of the cable (3), wherein each connector (2) is prewelded to the pipeline (4), and wherein each cone (1) comprises a bolt (9) extending coaxially as a prolongation from the cone (1), the connector (2) being provided, at it's remote end, with a locking plate (5) against which a nut (6) on the bolt (9) can be forced thereby tightening the cone (1) in the female chamber of the connector (2) and securing the contact.

2. Connector according to claim 1, wherein said connectors are displaced along the circumference of the pipeline (4).

* * * * *